(12) United States Patent
Hatano (10) Patent No.: US 11,594,909 B2
(45) Date of Patent: Feb. 28, 2023

(54) CONTROL DEVICE FOR POWER SUPPLY CIRCUIT, NON-TRANSITORY COMPUTER-READABLE STORAGE MEDIUM FOR STORING POWER SUPPLY CIRCUIT CONTROL PROGRAM, AND METHOD FOR CONTROLLING POWER SUPPLY CIRCUIT

(71) Applicant: TOYOTA JIDOSHA KABUSHIKI KAISHA, Toyota (JP)

(72) Inventor: Takahiro Hatano, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 17/208,550

(22) Filed: Mar. 22, 2021

(65) Prior Publication Data

US 2021/0336467 A1    Oct. 28, 2021

(30) Foreign Application Priority Data

Apr. 22, 2020    (JP) .............................. JP2020-076036

(51) Int. Cl.
*H02J 7/00*    (2006.01)

(52) U.S. Cl.
CPC ...... *H02J 7/007182* (2020.01); *H02J 7/0013* (2013.01); *H02J 7/0048* (2020.01); *H02J 7/0068* (2013.01)

(58) Field of Classification Search
CPC .. H02J 7/007182; H02J 7/0048; H02J 7/0013; H02J 7/0068
See application file for complete search history.

(56) References Cited

U.S. PATENT DOCUMENTS

| | | | |
|---|---|---|---|
| 2011/0310519 A1* | 12/2011 | Baba ...................... | H04L 12/10 361/91.1 |
| 2014/0117946 A1* | 5/2014 | Muller .................... | B60L 53/64 320/162 |
| 2015/0263624 A1* | 9/2015 | Nobe ...................... | H02M 1/32 323/299 |

FOREIGN PATENT DOCUMENTS

JP    2008-289326 A    11/2008

* cited by examiner

*Primary Examiner* — Drew A Dunn
*Assistant Examiner* — Pamela J Jeppson
(74) *Attorney, Agent, or Firm* — Sughrue Mion, PLLC (57) ABSTRACT

A control device of a power supply circuit includes processing circuitry. The processing circuitry includes a state-of-charge calculator and a target calculator. The state-of-charge calculator calculate a state of charge of the first battery. The target calculator calculates a target voltage range. When an output voltage of the first battery detected by a voltage sensor cannot be acquired and an acquisition failure occurs, after the occurrence of the acquisition failure, the state-of-charge calculator is configured to obtain the state of charge of the first battery, as a held state-of-charge, that was calculated before the occurrence of the acquisition failure. When a pre-charge process is performed in a state in which the acquisition failure is occurring, the target calculator is configured to calculate an estimated output voltage of the first battery from the held state-of-charge and calculate the target voltage range based on the estimated output voltage.

5 Claims, 4 Drawing Sheets

CONTROL DEVICE FOR POWER SUPPLY
CIRCUIT, NON-TRANSITORY
COMPUTER-READABLE STORAGE
MEDIUM FOR STORING POWER SUPPLY
CIRCUIT CONTROL PROGRAM, AND
METHOD FOR CONTROLLING POWER
SUPPLY CIRCUIT

1. FIELD

The following description relates to a control device for a power supply circuit, a non-transitory computer-readable storage medium that stores a power supply circuit control program, and a method for controlling a power supply circuit.

2. DESCRIPTION OF RELATED ART

Japanese Laid-Open Patent Publication No. 2008-289326 discloses a power system that includes a first battery, which is formed by a rechargeable battery. The first battery is connected to a voltage sensor that detects an output voltage of the first battery. Further, the first battery is connected to an electric load via a relay that opens and closes the electric connection. Also, the power system includes a second battery that has a lower rated voltage than the first battery. The second battery is connected to a converter that increases an output voltage of the second battery. The converter is connected to a portion between the relay and the electric load to supply the electric load with the increased output voltage.

Before starting to supply the electric load with the power from the first battery, a control device of the electric power system executes a pre-charge process that drives the converter to increase the output voltage, which is supplied from the converter to the electric load, until the output voltage becomes substantially equal to a target voltage in a state in which the relay is breaking the electric connection of the first battery and the electric load. When performing the pre-charge process, the control device sets the target voltage to the output voltage of the first battery detected by the voltage sensor.

The control device may not be able to obtain the output voltage of the first battery due to, for example, communication failure between the control device and the voltage sensor, a fault in the voltage sensor, or the like. In this case, the target voltage cannot be set. Thus, the pre-charge process cannot be performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a control device for a power supply circuit is provided. The power supply circuit includes a first battery, a voltage sensor, a relay, a second battery, and a converter. The voltage sensor is configured to detect an output voltage of the first battery. The relay is configured to open and close an electric connection from the first battery to a load. The second battery has a lower rated voltage than the first battery. The converter is configured to increase an output voltage of the second battery and output the increased output voltage to a portion between the relay and the load.

The control device includes processing circuitry. The processing circuitry is configured to perform a pre-charge process that drives the converter to increase an output voltage of the converter to a value included in a target voltage range, which is set based on the output voltage of the first battery, when the relay opens the electric connection between the first battery and the load. The processing circuitry includes a state-of-charge calculator and a target calculator. The state-of-charge calculator is configured to calculate a state of charge of the first battery. The target calculator is configured to calculate the target voltage range. When the output voltage of the first battery detected by the voltage sensor cannot be acquired and an acquisition failure occurs, after the occurrence of the acquisition failure, the state-of-charge calculator is configured to obtain the state of charge of the first battery, as a held state-of-charge, that was calculated before the occurrence of the acquisition failure. When the pre-charge process is performed in a state in which the acquisition failure is occurring, the target calculator is configured to calculate an estimated output voltage of the first battery from the held state-of-charge and calculate the target voltage range based on the estimated output voltage.

In another general aspect, a non-transitory computer-readable storage medium that stores a power supply circuit control program is provided. The power supply circuit control program is executed by processing circuitry of a control device for a power supply circuit. The power supply circuit includes a first battery, a voltage sensor, a relay, a second battery, and a converter. The voltage sensor is configured to detect an output voltage of the first battery. The relay is configured to open and close an electric connection from the first battery to a load. The second battery has a lower rated voltage than the first battery. The converter is configured to increase an output voltage of the second battery and output the increased output voltage to a portion between the relay and the load. When the power supply circuit control program is executed by the processing circuitry of the control device for the power supply circuit, the power supply circuit control program has the processing circuitry execute a pre-charge process, a state-of-charge calculation process, and a target calculation process. The pre-charge process drives the converter to increase an output voltage of the converter to a value included in a target voltage range, which is set based on the output voltage of the first battery, when the relay opens the electric connection between the first battery and the load. The state-of-charge calculation process calculates a state of charge of the first battery. The target calculation process calculates the target voltage range. When the output voltage detected by the voltage sensor cannot be acquired and an acquisition failure occurs, after the occurrence of the acquisition failure, the state-of-charge calculation process includes a process that obtains the state of charge of the first battery, as a held state-of-charge, that was calculated before the occurrence of the acquisition failure. When the pre-charge process is performed in a state in which the acquisition failure is occurring, the target calculation process includes a process that calculates an estimated output voltage of the first battery from the held state-of-charge and calculates the target voltage range based on the estimated output voltage.

In another general aspect, a method for controlling a power supply circuit is provided. The power supply circuit includes a first battery, a voltage sensor, a relay, a second battery, and a converter. The voltage sensor is configured to detect an output voltage of the first battery. The relay is configured to open and close an electric connection from the first battery to a load. The second battery has a lower rated voltage than the first battery. The converter is configured to increase an output voltage of the second battery and output the increased output voltage to a portion between the relay and the load. The method includes performing a pre-charge process, performing a state-of-charge calculation process, and performing a target calculation process. The pre-charge process drives the converter to increase an output voltage of the converter to a value included in a target voltage range, which is set based on the output voltage of the first battery, when the relay opens the electric connection between the first battery and the load. The state-of-charge calculation process calculates a state of charge of the first battery. The target calculation process calculates the target voltage range. When the output voltage detected by the voltage sensor cannot be acquired and an acquisition failure occurs, after the occurrence of the acquisition failure, the state-of-charge calculation process includes a process that obtains the state of charge of the first battery, as a held state-of-charge, that was calculated before the occurrence of the acquisition failure. When the pre-charge process is performed in a state in which the acquisition failure is occurring, the target calculation process includes a process that calculates an estimated output voltage of the first battery from the held state-of-charge and calculates the target voltage range based on the estimated output voltage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of a control device for a power supply circuit will now be described with reference to the drawings.

First, the schematic configuration of a power system installed in a vehicle will be described.

Figure 1:
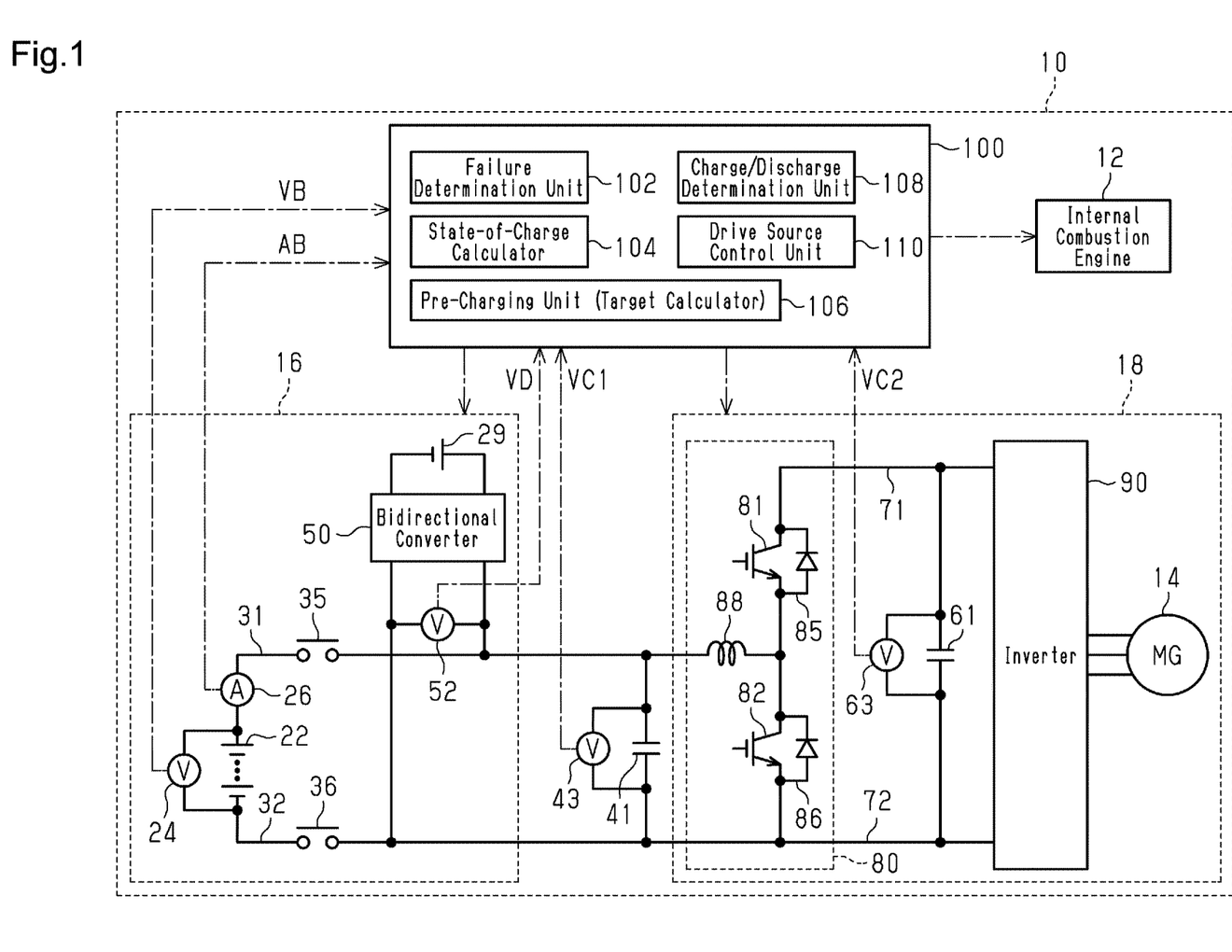
FIG. 1 is a schematic diagram showing the configuration of a power system for a vehicle.

As shown in FIG. 1, a hybrid vehicle (hereafter, referred to as vehicle) 10 includes an internal combustion engine 12 that serves as a drive source of the vehicle 10. Further, the vehicle 10 includes a motor generator 14 that serves as a drive source differing from the internal combustion engine 12. The motor generator 14 has the functions of both a motor and a generator.

The vehicle 10 includes a first battery 22 that is a rechargeable battery, which sends power to and receives power from the motor generator 14. Specifically, the first battery 22 supplies the motor generator 14 with power and stores the power generated by the motor generator 14. The first battery 22 has a rated voltage of, for example, approximately 200 V to 250 V and is used by the vehicle 10 when the vehicle 10 travels. A first battery voltage sensor 24 is connected between the terminals of the first battery 22 to detect the output voltage of the first battery 22 as a battery output voltage VB.

The first battery 22 is connected to a buck-boost converter 80 by two power lines. Specifically, a first positive electrode line 31 connects the positive terminal of the first battery 22 to the buck-boost converter 80. Also, a first negative electrode line 32 connects the negative terminal of the first battery 22 to the buck-boost converter 80. The buck-boost converter 80 increases and decreases the voltage output.

A current sensor 26 is connected to the first positive electrode line 31 to detect a charge/discharge current AB that flows through the first battery 22. In the present embodiment, when the first battery 22 is being discharged, the detected charge/discharge current AB is a positive value, and when the first battery 22 is being charged, the detected charge/discharge current AB is a negative value.

A positive electrode relay 35 is arranged in the first positive electrode line 31. The positive electrode relay 35 is located between the current sensor 26 and the buck-boost converter 80. The positive electrode relay 35 is configured to open and close the electric connection between the first battery 22 and the buck-boost converter 80. Further, a negative electrode relay 36 is connected to the first negative electrode line 32 to open and close the electric connection between the first battery 22 and the buck-boost converter 80. When the positive electrode relay 35 and the negative electrode relay 36 are shifted to an open state, the first battery 22 and the buck-boost converter 80 are electrically disconnected. When the positive electrode relay 35 and the negative electrode relay 36 are shifted to a closed state, the first battery 22 and the buck-boost converter 80 are electrically connected.

The first positive electrode line 31 and the first negative electrode line 32 are connected to a bidirectional converter 50. More specifically, the bidirectional converter 50 is connected to the first positive electrode line 31, between the positive electrode relay 35 and the buck-boost converter 80, and to the first negative electrode line 32, between the negative electrode relay 36 and the buck-boost converter 80. The bidirectional converter 50 is connected to a second battery 29, which is a rechargeable battery. The second battery 29 has a rated voltage of, for example, approximately 12 V to 48 V and is used to drive an auxiliary member.

The bidirectional converter 50 includes transistors (not shown) and diodes (not shown) and increases and decreases voltage. Specifically, the bidirectional converter 50 increases and outputs the output voltage of the second battery 29 to the first positive electrode line 31 and the first negative electrode line 32. Also, the bidirectional converter 50 decreases and outputs the voltage at the first positive electrode line 31 and the first negative electrode line 32 to the second battery 29. The bidirectional converter 50 is connected to a converter voltage sensor 52 that detects the voltage output from the bidirectional converter 50 to the first positive electrode line 31 and the first negative electrode line 32 as a converter output voltage VD.

In the present embodiment, the first battery 22, the first battery voltage sensor 24, the current sensor 26, the first positive electrode line 31, the first negative electrode line 32, the positive electrode relay 35, the negative electrode relay 36, the second battery 29, the bidirectional converter 50, and the converter voltage sensor 52 form a power supply circuit.

A first capacitor 41 is connected to the first positive electrode line 31 and the first negative electrode line 32 to smooth the voltage between the first battery 22 and the buck-boost converter 80. More specifically, the first capacitor 41 is connected to the first positive electrode line 31 between the buck-boost converter 80 and a node of the bidirectional converter 50 and the first positive electrode line 31 and to the first negative electrode line 32 between the buck-boost converter 80 and a node of the bidirectional converter 50 and the first negative electrode line 32. A first capacitor voltage sensor 43 is connected between the terminals of the first capacitor 41 to detect a charging voltage of the first capacitor 41 as a first charging voltage VC1.

The buck-boost converter 80 includes switching elements, namely, a first transistor 81 and a second transistor 82, that are connected in series. The first transistor 81 and the second transistor 82 are both negative-positive-negative (NPN) type transistors. The first transistor 81 is connected in parallel to a first freewheeling diode 85, and the second transistor 82 is connected in parallel to a second freewheeling diode 86.

The first positive electrode line 31 is connected via a reactor 88 to a node of the emitter terminal of the first transistor 81 and the collector terminal of the second transistor 82. The collector terminal of the first transistor 81 is connected by a second positive electrode line 71 to an inverter 90. The emitter terminal of the second transistor 82 is connected by a second negative electrode line 72 to the inverter 90 and to the first negative electrode line 32. The inverter 90 is connected to the motor generator 14. A control voltage is input to the base terminal (not shown) of the first transistor 81 and the base terminal (not shown) of the second transistor 82 to switch the transistors on and off. The inverter 90 converts direct current into alternating current between the buck-boost converter 80 and the motor generator 14.

A second capacitor 61 is connected to the second positive electrode line 71 and the second negative electrode line 72 to smooth the voltage between the buck-boost converter 80 and the inverter 90. A second capacitor voltage sensor 63 is connected between the terminals of the second capacitor 61 to detect a charging voltage of the second capacitor 61 as a second charging voltage VC2.

In the present embodiment, the motor generator 14, the inverter 90, and the buck-boost converter 80 form an electric load (hereafter, referred to as load) 18. Further, the load 18, the power supply circuit 16, the first capacitor 41, and the second capacitor 61 form the power system.

The control configuration of the vehicle 10 will now be described.

A vehicle control device 100 is installed in the vehicle 10 to control various types of components, including the power system of the vehicle 10. The vehicle control device 100 may be one or more processors that run a computer program (software) to execute various types of processes. The vehicle control device 100 may be processing circuitry that includes one or more exclusive hardware circuits such as an application specific integrated circuit (ASIC) to execute at least some of the processes. The vehicle control device 100 may be a combination of the above. The processor includes a computer processing unit (CPU) and a memory, such as a random-access memory (RAM) or a read-only memory (ROM). The memory stores program codes or commands that are configured to have the CPU execute a process. The memory, which is a computer readable storage medium, includes any available medium that is accessible by a versatile or dedicated computer. For example, a power supply circuit control program may be stored in a non-transitory computer-readable storage medium.

The vehicle control device 100 receives detection signals from various sensors arranged in the vehicle 10. Specifically, the following detection signals are input to the vehicle control device 100.

The battery output voltage VB detected by the first battery voltage sensor 24.

The charge/discharge current AB detected by the current sensor 26.

The converter output voltage VD detected by the converter voltage sensor 52.

The first charging voltage VC1 detected by the first capacitor voltage sensor 43.

The second charging voltage VC2 detected by the second capacitor voltage sensor 63.

When the communication line between the first battery voltage sensor 24 and the vehicle control device 100 includes a failure or the like, the vehicle control device 100 may not be able to acquire the battery output voltage VB detected by the first battery voltage sensor 24. The vehicle control device 100 includes a failure determination unit 102 that determines whether a failure occurred when attempting to acquire the battery output voltage VB acquisition failure.

The vehicle control device 100 includes a state-of-charge calculator 104 that calculates a state of charge SOC of the first battery 22. As indicated by the following equation (1), the state of charge SOC is a value obtained by dividing a remaining capacity YL of the first battery 22 by a fully charged capacity YA and multiplying by one hundred.

$$SOC[\%]=YL[Ah]/YA[Ah]\times 100 \tag{1}$$

The state-of-charge calculator 104 calculates a held state-of-charge KSOC as the state of charge SOC that is held and used when an acquisition failure occurs. In the present embodiment, the state-of-charge calculator 104 calculates the held state-of-charge KSOC regardless of whether an acquisition failure has occurred. When an acquisition failure has not occurred, the state-of-charge calculator 104 directly obtains the state of charge SOC of the first battery 22 as the held state-of-charge KSOC. When an acquisition failure occurs, the state-of-charge calculator 104 obtains the state of charge SOC of the first battery 22, which was calculated before the occurrence of the acquisition failure, as the held state-of-charge KSOC after the occurrence of the acquisition failure. In the present embodiment, when an acquisition failure occurs, the state-of-charge calculator 104 obtains the most recently calculated state of charge SOC of the first battery 22, as the held state-of-charge KSOC, from the multiple state of charge SOC of the first battery 22 that were calculated before the occurrence of the acquisition failure.

When an ignition switch G of the vehicle 10 is switched on, the positive electrode relay 35 and the negative electrode relay 36 are shifted to a closed state, and the first battery 22 starts supplying power to the buck-boost converter 80. In this case, a large current may momentarily flow from the high-voltage first battery 22 to the buck-boost converter 80 and fuse the positive electrode relay 35 and the negative electrode relay 36. To avoid such a situation, the first capacitor 41 needs to be charged in a state in which the electric connection between the first battery 22 and the buck-boost converter 80 is open before starting the supply of power from the first battery 22 to the buck-boost converter 80. When the first capacitor 41 is charged in advance, the voltage difference between the first battery 22 and the first capacitor 41 will be decreased, and the current flowing through the positive electrode relay 35 and the negative electrode relay 36 will be smaller.

The vehicle control device 100 includes a pre-charging unit 106 that performs a pre-charge process, which charges the first capacitor 41. In the pre-charge process, the pre-charging unit 106 controls various components such as the bidirectional converter 50 and the relays of the power supply circuit 16. Further, in the pre-charge process, the pre-charging unit 106 drives the bidirectional converter 50 to increase the output voltage of the bidirectional converter 50 to a value within a target voltage range VZ while maintaining the positive electrode relay 35 and the negative electrode relay 36 in an open state. The target voltage range VZ is set based on the output voltage of the first battery 22. During the pre-charge process, the charging voltage of the first capacitor 41 becomes substantially equal to the output voltage of the bidirectional converter 50. Further, when the pre-charge process is performed, the buck-boost converter 80 and the inverter 90 are in a non-drive state. In this case, the first positive electrode line 31 is connected to the second positive electrode line 71 via the first diode 85 so that the charging voltage of the second capacitor 61 also becomes substantially equal to the output voltage of the bidirectional converter 50. Therefore, in the pre-charge process, the pre-charging unit 106 increases the charging voltage of the first capacitor 41 and the charging voltage of the second capacitor 61 to the target voltage range VZ.

When performing the pre-charge process, the pre-charging unit 106 calculates the target voltage range VZ. When an acquisition failure does not occur, the pre-charging unit 106 calculates the target voltage range VZ based on the battery output voltage VB detected by the first battery voltage sensor 24. When an acquisition failure occurs, the pre-charging unit 106 calculates an estimated output voltage EVB of the first battery 22 from the held state-of-charge KSOC of the first battery 22 and calculates the target voltage range VZ based on the estimated output voltage EVB. In this manner, in the present embodiment, the pre-charging unit 106 functions as a target calculator that calculates the target voltage range VZ.

The vehicle control device 100 includes a charge/discharge determination unit 108 that determines whether to permit charging/discharging of the first battery 22. When an acquisition failure has not occurred, the charge/discharge determination unit 108 permits charging/discharging of the first battery 22. When an acquisition failure occurs, the charge/discharge determination unit 108 prohibits charging/discharging of the first battery 22. To reflect whether charging/discharging of the first battery 22 is permitted on the control of the motor generator 14, the charge/discharge determination unit 108 sets a charge/discharge prohibition flag FN to indicate whether charging/discharging of the first battery 22 is prohibited. When an acquisition failure has not occurred, the charge/discharge determination unit 108 switches off the charge/discharge prohibition flag FN. When an acquisition failure occurs, the charge/discharge determination unit 108 switches on the charge/discharge prohibition flag FN.

The vehicle control device 100 includes a drive source control unit 110 that controls the internal combustion engine 12 and the motor generator 14. The drive source control unit 110 controls the buck-boost converter 80 and the inverter 90 to substantially control the motor generator 14. When the charge/discharge prohibition flag FN is off, the drive source control unit 110 shifts the buck-boost converter 80 and the inverter 90 to a drive state and the motor generator 14 to a drive state. When the charge/discharge prohibition flag FN is on, the drive source control unit 110 shifts the buck-boost converter 80 and the inverter 90 to a non-drive state and the motor generator 14 to a non-drive state. That is, the drive source control unit 110 does not actuate the motor generator 14 as a motor or a generator. In this case, the drive source control unit 110 only drives the internal combustion engine 12.

A process executed by the failure determination unit 102 to determine the occurrence of an acquisition failure will now be described. The failure determination unit 102 repeats the process for determining the occurrence of an acquisition failure from when the ignition switch G is switched on until the ignition switch G is switched off. The process is executed under the condition that the failure determination unit 102 repetitively receives the battery output voltage VB, which is detected by the first battery voltage sensor 24.

When a situation in which the battery output voltage VB cannot be acquired from the first battery voltage sensor 24 continues over a predetermined period or longer, the failure determination unit 102 determines that an acquisition failure has occurred. The predetermined period is set to a period sufficiently longer than a receiving cycle of the battery output voltage VB. A situation in which the failure determination unit 102 cannot acquire the battery output voltage VB occurs, for example, when a communication failure occurs such as when the communication line between the first battery voltage sensor 24 and the vehicle control device 100 breaks or when a connector of the communication line is separated from an input port of the vehicle control device 100.

In addition, the failure determination unit 102 determines that an acquisition failure has occurred if the battery output voltage VB is a value outside a predetermined normal range even when the battery output voltage VB is acquired from the first battery voltage sensor 24. The normal range is set to a normal value range of the battery output voltage VB. A situation in which the battery output voltage VB has a value outside the normal range occurs, for example, when a failure occurs in the first battery voltage sensor 24 and the first battery voltage sensor 24 thereby cannot detect the battery output voltage VB properly.

When none of the above described situations applies, the failure determination unit 102 determines that an acquisition failure has not occurred. When the failure determination unit 102 determines that an acquisition failure has occurred, the failure determination unit 102 switches on an acquisition failure flag FC. When the failure determination unit 102 determines that an acquisition failure has not occurred, the failure determination unit 102 switches off the acquisition failure flag FC.

Figure 2:
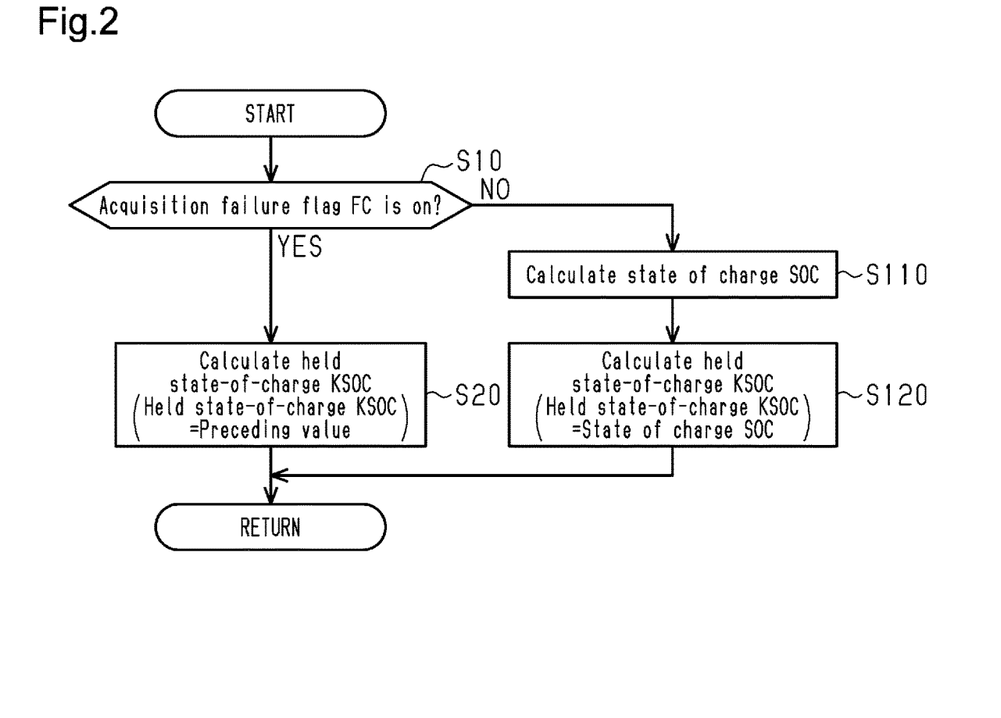
FIG. 2 is a flowchart illustrating the procedure for performing a state-of-charge calculation process.

A state-of-charge calculation process executed by the state-of-charge calculator 104 will now be described. The state-of-charge calculation process is performed to calculate the state of charge SOC of the first battery 22 and the held state-of-charge KSOC. The state-of-charge calculator 104 repeats the state-of-charge calculation process from when the ignition switch G is switched on until the ignition switch G is switched off. The state-of-charge calculator 104 will not clear the held state-of-charge KSOC which is held when the ignition switch G is switched off and will store the held state-of-charge KSOC until the ignition switch G is switched on again.

As shown in FIG. 2, when the state-of-charge calculation process starts, the state-of-charge calculator 104 proceeds to step S10. In step S10, the state-of-charge calculator 104 determines whether the acquisition failure flag FC is on. When the acquisition failure flag FC is off (NO in step S10), the state-of-charge calculator 104 proceeds to step S110.

In step S110, the state-of-charge calculator 104 calculates the state of charge SOC of the first battery 22. In the present embodiment, the state-of-charge calculator 104 calculates the state of charge SOC using the current integration method. Here, the state-of-charge calculator 104 calculates an integral SAB of the charge/discharge current AB in the background from when the ignition switch G is switched on. When calculating the state of charge SOC, the state-of-charge calculator 104 obtains the most recent integral SAB of the charge/discharge current AB. Subsequently, as indicated by equation (2), which is shown below, the state-of-charge calculator 104 adds the value obtained by dividing the integral SAB of the charge/discharge current AB by the fully charged amount YA of the first battery 22 and multiplying by one hundred to an initial state-of-charge YS to calculate the state of charge SOC. The state-of-charge calculator 104 stores the fully charged amount YA of the first battery 22 in advance. The initial state-of-charge YS is the state of charge SOC of the first battery 22 when the ignition switch G is switched on, or the held state-of-charge KSOC stored in the state-of-charge calculator 104 when the ignition switch G is switched on. The state-of-charge calculator 104 holds the initial state-of-charge YS as long as the ignition switch G is on.

$$SOC[\%]=YS[\%]+(SAB\ [Ah]\div YA\ [Ah])\times 100 \qquad (2)$$

After step S110, the state-of-charge calculator 104 proceeds to step S120.

In step S120, the state-of-charge calculator 104 calculates the held state-of-charge KSOC. Specifically, the state-of-charge calculator 104 obtains the state of charge SOC calculated in step S110 as the held state-of-charge KSOC. After step S120, the state-of-charge calculator 104 temporarily ends the state-of-charge calculation process. Then, the state-of-charge calculator 104 performs step S10 again.

In step S10, when the acquisition failure flag FC is on (YES in step S10), the state-of-charge calculator 104 proceeds to step S20. In step S20, the state-of-charge calculator 104 obtains the held state-of-charge KSOC held when step S20 is performed as the most recent held state-of-charge KSOC. After step S20, the state-of-charge calculator 104 temporarily ends the state-of-charge calculation process. Then, the state-of-charge calculator 104 performs step S10 again.

Figure 4:
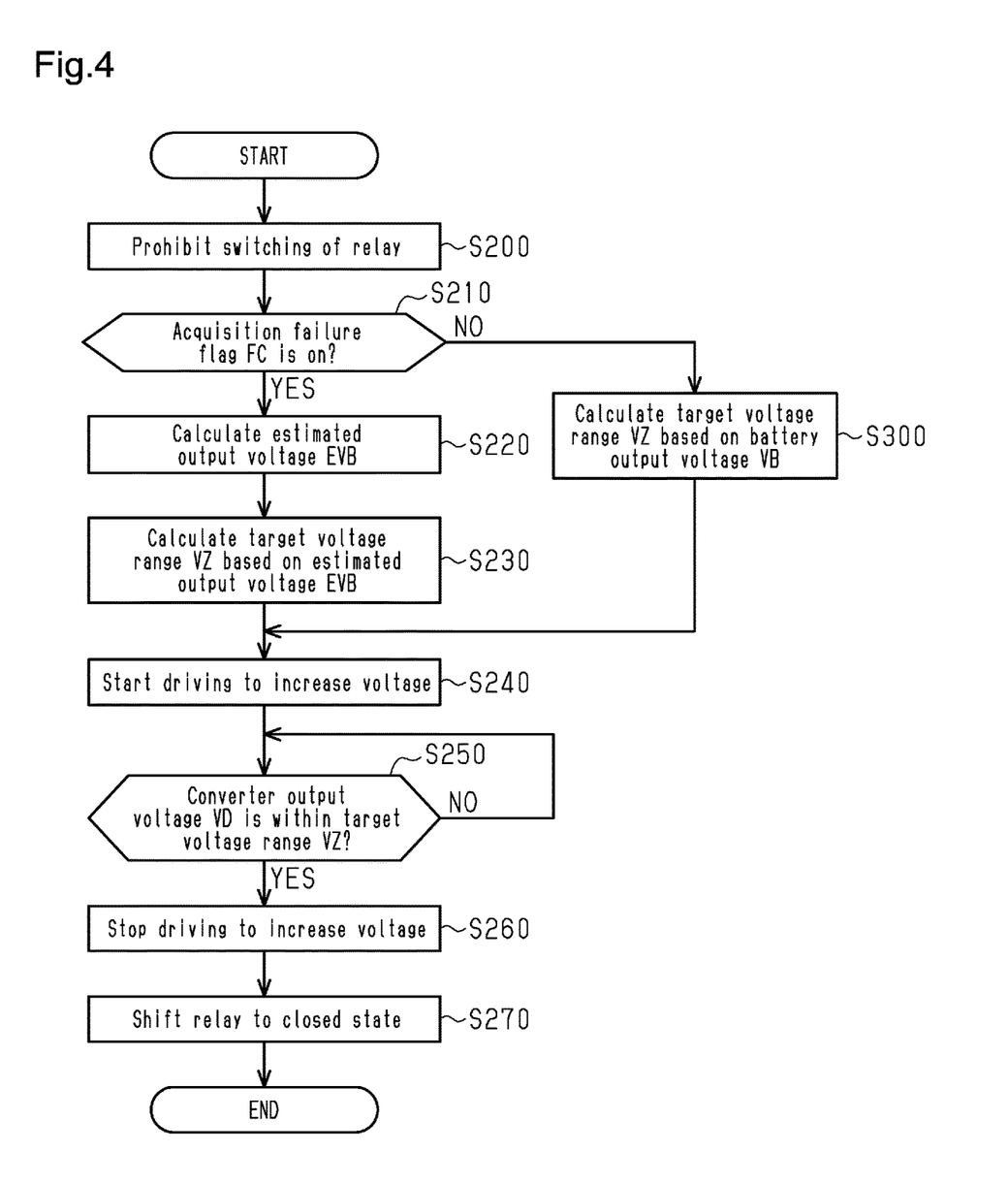
FIG. 4 is a flowchart illustrating a procedure of a pre-charge process.

The pre-charge process executed by the pre-charging unit 106 will now be described. The pre-charging unit 106 executes the pre-charge process only once during a period from when the ignition switch G is switched on to when the ignition switch G is switched off. When the pre-charging unit 106 is executing the pre-charge process, the pre-charging unit 106 is given priority over other functional units that execute control on the power supply circuit 16. When the ignition switch G is switched on, the positive electrode relay 35 and the negative electrode relay 36 are in an open state.

When the ignition switch G is switched on, the pre-charging unit 106 starts the pre-charge process. As shown in FIG. 4, when the pre-charge process starts, the pre-charging unit 106 proceeds to step S200. In step S200, the pre-charging unit 106 prohibits switching of the positive electrode relay 35 and the negative electrode relay 36 to a closed state. That is, the positive electrode relay 35 and the negative electrode relay 36 are maintained in the open state. Then, the pre-charging unit 106 proceeds to step S210.

In step S210, the pre-charging unit 106 determines whether the acquisition failure flag FC is on. When the acquisition failure flag FC is off (NO in step S210), the pre-charging unit 106 proceeds to step S300.

In step S300, the pre-charging unit 106 calculates the target voltage range VZ based on the battery output voltage VB detected by the first battery voltage sensor 24. Specifically, the pre-charging unit 106 obtains the newest battery output voltage VB. Then, the pre-charging unit 106 calculates the value of a lower limit of the target voltage range VZ by subtracting a tolerable differential voltage VP from the battery output voltage VB. Further, the pre-charging unit 106 calculates the value of an upper limit of the target voltage range VZ by adding the tolerable differential voltage VP to the battery output voltage VB. The pre-charging unit 106 stores the tolerable differential voltage VP in advance. With respect to the voltage difference of the first battery 22 and the first capacitor 41, experiments and simulations were conducted to determine the tolerable differential voltage VP as the voltage difference with which the positive electrode relay 35 and the negative electrode relay 36 do not fuse when the positive electrode relay 35 and the negative electrode relay 36 are shifted to a closed state. After step S300, the pre-charging unit 106 proceeds to step S240.

Figure 3:
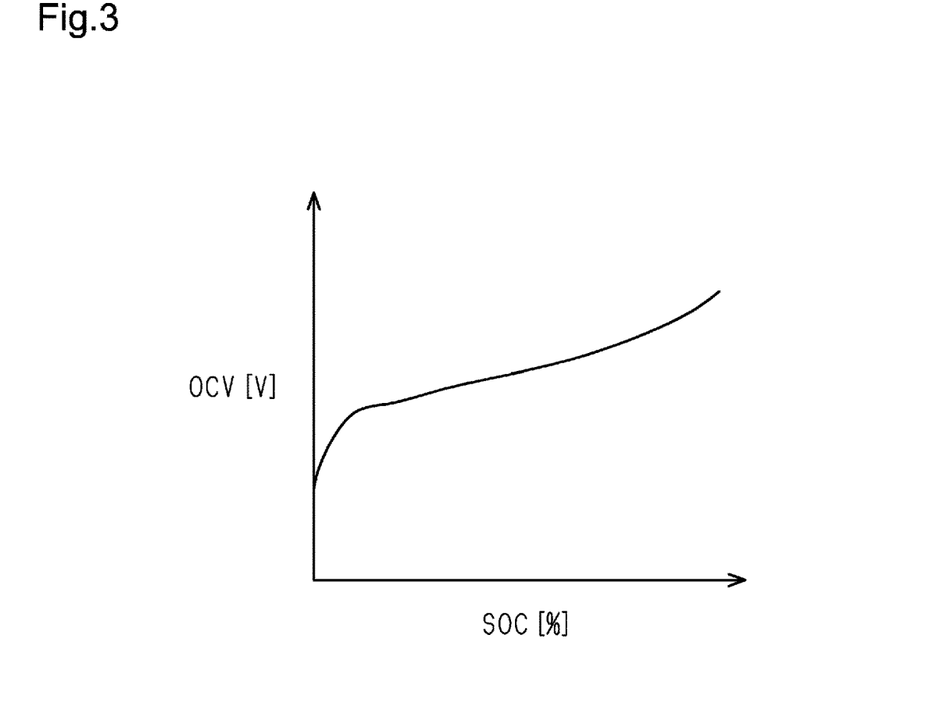
FIG. 3 is a diagram showing an example of a characteristic map.

When the acquisition failure flag FC is on in step S210 (YES in step S210), the pre-charging unit 106 proceeds to step S220. In step S220, the pre-charging unit 106 calculates the estimated output voltage EVB of the first battery 22 from the held state-of-charge KSOC. The pre-charging unit 106 stores in advance a characteristic map that indicates the relationship of the state of charge SOC of the first battery 22 and an open circuit voltage OCV of the first battery 22. The open circuit voltage OCV of the first battery 22 is the output voltage of the first battery 22 in a state in which the charge/discharge current AB is not flowing through the first battery 22. The characteristic map, which indicates the relationship of the state of charge SOC of the first battery 22 and the open circuit voltage OCV of the first battery 22, is generated for the individual product of the first battery 22. The characteristic map is generated from experiments, simulations, and the like. As shown in FIG. 3, in the schematic characteristic map, the open circuit voltage OCV increases as the state of charge SOC increases.

When calculating the estimated output voltage EVB, the pre-charging unit 106 first obtains the most recent held state-of-charge KSOC calculated by the state-of-charge calculator 104. Also, the state-of-charge calculator 104 refers to the characteristic map. Then, the state-of-charge calculator 104 obtains the open circuit voltage OCV that corresponds to the held state-of-charge KSOC from the characteristic map as the estimated output voltage EVB. After step S220 in FIG. 4, the state-of-charge calculator 104 proceeds to step S230.

In step S230, the pre-charging unit 106 calculates the target voltage range VZ from the estimated output voltage EVB. Specifically, the pre-charging unit 106 calculates the value of the lower limit of the target voltage range VZ by subtracting the tolerable differential voltage VP from the estimated output voltage EVB. Further, the pre-charging unit 106 calculates the value of the upper limit of the target voltage range VZ by adding the tolerable differential voltage VP to the estimated output voltage EVB. After step S230, the pre-charging unit 106 proceeds to step S240. The processes in steps S220, S230, and S300 correspond to a target calculation process.

In step S240, the pre-charging unit 106 starts driving the bidirectional converter 50 to increase the voltage of the bidirectional converter 50. Then, the pre-charging unit 106 proceeds to step S250.

In step S250, the pre-charging unit 106 determines whether the value of the converter output voltage VD detected by the converter voltage sensor 52 is included in the target voltage range VZ. Specifically, the pre-charging unit 106 obtains the newest converter output voltage VD. Then, the pre-charging unit 106 compares the converter output voltage VD with the lower limit and the upper limit of the target voltage range VZ. When the value of the converter output voltage VD is outside the target voltage range VZ (NO in step S250), the pre-charging unit 106 performs step S250 again. The pre-charging unit 106 repeats step S250 until the value of the converter output voltage VD enters the target voltage range VZ. When the value of the converter output voltage VD enters the target voltage range VZ (YES in step S250), the pre-charging unit 106 proceeds to step S260.

In step S260, the pre-charging unit 106 deactivates the bidirectional converter 50 to stop increasing the voltage. Then, the pre-charging unit 106 proceeds to step S270.

In step S270, the pre-charging unit 106 shifts the positive electrode relay 35 and the negative electrode relay 36 to a closed state. Subsequently, the pre-charging unit 106 ends the pre-charge process.

The operation of the present embodiment will now be described.

Figure 5:
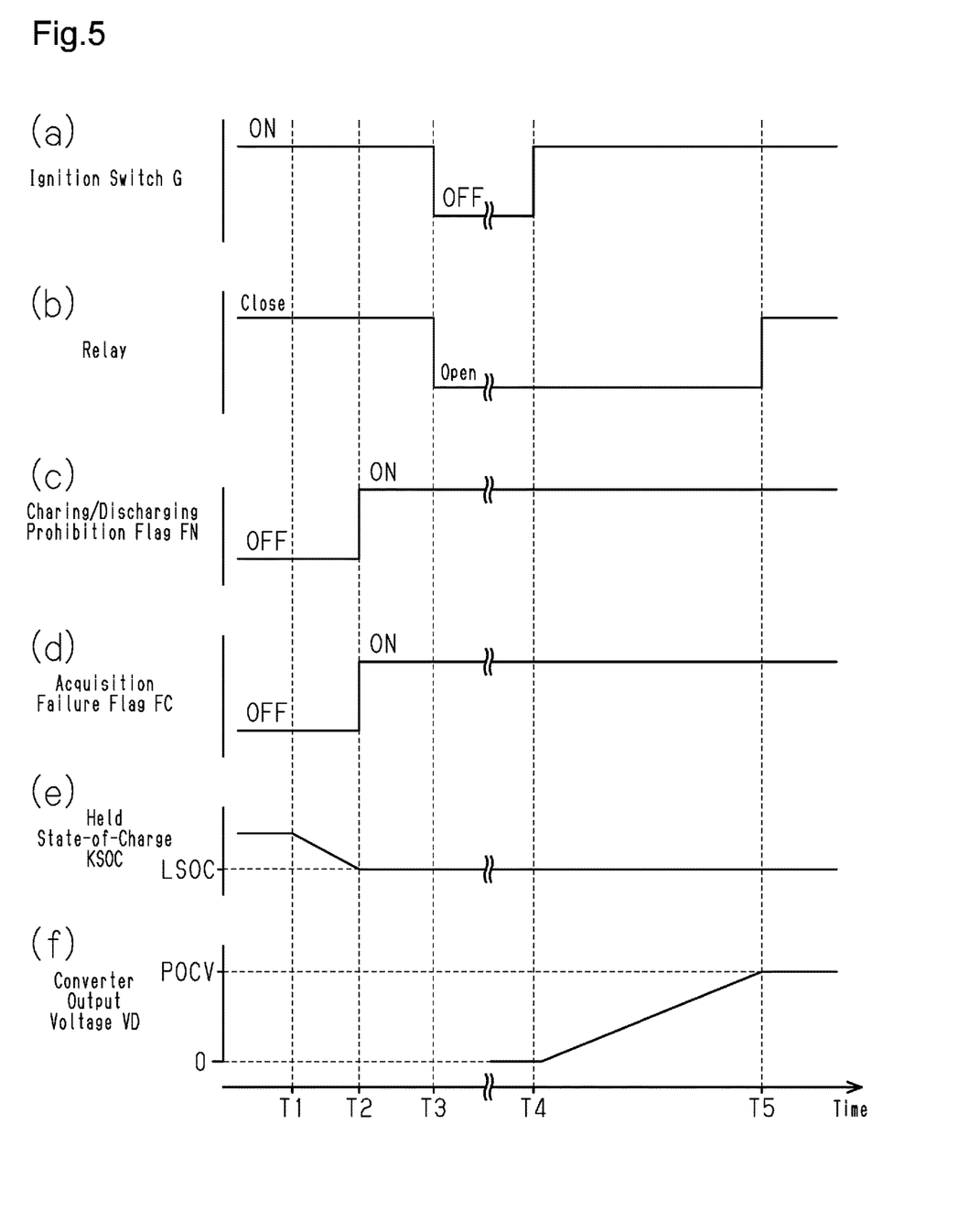
FIG. 5 is a time diagram illustrating the properties of time and various parameters in an example of the state-of-charge calculation process and the pre-charge process.

As shown in (b) of FIG. 5, at time T1, the vehicle 10 is traveling and the positive electrode relay 35 and the negative electrode relay 36 are both in a closed state. Also, at time T1, an acquisition failure is not occurring. In this case, the acquisition failure flag FC is off as shown in (d) of FIG. 5. Accordingly, the charge/discharge prohibition flag FN is also off as shown in (c) of FIG. 5. In other words, the motor generator 14 is in a drive state.

At time T2, which is later than time T1, an acquisition failure has occurred. In this case, as shown in (d) of FIG. 5, the acquisition failure flag FC is switched on. Accordingly, as shown in (c) of FIG. 5, the charge/discharge prohibition flag FN is switched on and the motor generator 14 is shifted to a non-drive state. Hereafter, the vehicle 10 uses only the output of the internal combustion engine 12 to travel. Further, after the acquisition failure flag FC is switched on at time T2, a pre-failure state-of-charge LSOC is calculated as the held state-of-charge KSOC. The pre-failure state-of-charge LSOC is the state of charge SOC of the first battery 22 that was most recently calculated before the acquisition failure flag FC was switched on.

As shown in (a) of FIG. 5, at time T3, which is later than time T2, the ignition switch G is switched off. Accordingly, as shown in (b) of FIG. 5, the positive electrode relay 35 and the negative electrode relay 36 are shifted to an open state. Then, as shown in (a) of FIG. 5, the ignition switch G is switched on again at time T4, which is later than time T3. The acquisition failure is continuously occurring even after time T4. In this case, as shown in (e) of FIG. 5, the pre-failure state-of-charge LSOC is continuously used as the held state-of-charge KSOC at time T4 and onward.

When the ignition switch G is switched on at time T4, the target voltage range VZ is calculated to start the pre-charge process. Since the acquisition failure is occurring, the target voltage range VZ is calculated from the estimated output voltage EVB, which is based on the held state-of-charge KSOC. The estimated output voltage EVB is the open circuit voltage of the first battery 22 immediately before the acquisition failure occurred. The motor generator 14 is shifted to a non-drive state at time T2, which is when the acquisition failure occurred. Thus, from time T2 to time T4, the open circuit voltage OCV of the first battery 22 is maintained at a value substantially equal to the value obtained at time T2, which is when the acquisition failure occurred. Therefore, an open circuit voltage POCV for when the pre-charge process is performed is equal to the estimated output voltage EVB.

After the target voltage range VZ is calculated, the bidirectional converter 50 is driven, and the voltage of the bidirectional converter 50 starts to increase. After the ignition switch G is switched off at time T3, the converter output voltage VD is decreased to zero before time T4, as shown in (f) of FIG. 5. Then, when the bidirectional converter 50 is driven and the voltage of the bidirectional converter 50 starts to increase at time T4 as described above, the converter output voltage VD increases from zero. When the converter output voltage VD enters the target voltage range VZ at time T5, the bidirectional converter 50 is deactivated and the voltage stops increasing. Subsequently, as shown in (b) of FIG. 5, the positive electrode relay 35 and the negative electrode relay 36 are shifted to a closed state.

The present embodiment has the following advantages.

(1) In the above-described configuration, the estimated output voltage EVB of the first battery 22 obtained before the occurrence of an acquisition failure is used to calculate the target voltage range VZ. Before an acquisition failure occurs, the positive electrode relay 35 and the negative electrode relay 36 are in the closed state. Thus, the first battery 22, which is electrically connected to the load 18, sends power to and receives power from the load 18. When power is being transmitted between the first battery 22 and the load 18, the battery output voltage VB detected by the first battery voltage sensor 24 fluctuates from the open circuit voltage OCV of the first battery 22. If the output voltage that includes such a fluctuation from the open circuit voltage OCV is applied to the calculation of the target voltage range VZ, it will be difficult to set the target voltage range VZ to an appropriate value.

In contrast, the state of charge SOC of the first battery 22 corresponds to the open circuit voltage OCV regardless of whether power is being transmitted between the first battery 22 and the load 18. This allows the open circuit voltage OCV of the first battery 22 obtained before the occurrence of an acquisition failure to be used as the estimated output voltage EVB, which is based on the state of charge SOC of the first battery 22. Further, in the above-described configuration, the estimated output voltage EVB is calculated from the most recent state of charge SOC of the first battery 22 that was obtained before the occurrence of an acquisition failure. This allows the open circuit voltage OCV of the first battery 22 immediately before the occurrence of an acquisition failure to be calculated as the estimated output voltage EVB. Since the target voltage range VZ is calculated based on the estimated output voltage EVB, the target voltage range VZ is set appropriately. Also, the target voltage range VZ is set so that the pre-charge process can be performed even if an acquisition failure occurs.

(2) In the above-described configuration, when an acquisition failure occurs, charging and discharging of the first battery 22 is prohibited. Thus, as described above, the open circuit voltage OCV of the first battery 22 is maintained at a value that is substantially equal to the value obtained immediately before the occurrence of an acquisition failure from when the acquisition failure occurs until when the pre-charge process is performed. In other words, the open circuit voltage OCV of the first battery 22 changes subtly from when an acquisition failure occurs until when the pre-charge process is performed. This increases the probability that the estimated output voltage EVB, which is based on the state of charge SOC obtained immediately before the acquisition failure occurs, will be equal to the open circuit voltage OCV of the first battery 22, which would be obtained when the pre-charge process is actually performed. The target voltage range VZ is determined from the estimated output voltage EVB. This allows the target voltage range VZ to be set by input values that are substantially equal to a value that would be used when the battery output voltage VB is acquired from the first battery voltage sensor 24.

The present embodiment may be modified as follows. The present embodiment and the following modifications can be combined as long as the combined modifications remain technically consistent with each other.

The calculation method of the target voltage range VZ is not limited to the example described in the above embodiment. For example, the tolerable differential voltage VP used to calculate the lower limit of the target voltage range VZ may differ from the tolerable differential voltage VP used to calculate the lower limit of the target voltage range VZ. In this case, the tolerable differential voltage VP for calculating the lower limit and the tolerable differential voltage VP for calculating the upper limit are determined so that the positive electrode relay 35 and the negative electrode relay 36 do not fuse.

The tolerable differential voltage VP is set to avoid relay fusing. Instead, the tolerable differential voltage VP may be set to a value that avoids relay actuation failures when current flows through the positive electrode relay 35 and the negative electrode relay 36 in a closed state.

When the positive electrode relay 35 and the negative electrode relay 36 used withstand high-voltage and large currents, the tolerable differential voltage VP may be set to zero. In this case, the target voltage range VZ will be a certain value rather than a fixed range.

The procedure for determining whether the bidirectional converter 50 has been deactivated to stop increasing the voltage is not limited to the example described in the above embodiment. For example, it may be determined whether the first charging voltage VC1 detected by the first capacitor voltage sensor 43 is included in the target voltage range VZ. Alternatively, it may be determined whether the second charging voltage VC2 detected by the second capacitor voltage sensor 63 is included in the target voltage range VZ. Rather than using only one of the converter output voltage VD, the first charging voltage VC1, and the second charging voltage VC2, it may be determined whether more than one of the above three values are included in the target voltage range VZ to prevent erroneous determinations.

The calculation process of the held state-of-charge KSOC is not limited to the example described in the above embodiment. After the occurrence of an acquisition failure, the calculation process of the held state-of-charge KSOC only needs to obtain the state of charge SOC of the first battery 22 that was calculated before the acquisition failure occurred as the held state-of-charge KSOC. For example, after the occurrence of an acquisition failure, the held state-of-charge KSOC may be stored and held when the held state-of-charge KSOC is calculated once instead of repetitively calculating the held state-of-charge KSOC like in the above embodiment.

The held state-of-charge KSOC calculated after the occurrence of an acquisition failure does not have to be the most recent state of charge SOC of the first battery 22 that was calculated before the occurrence of an acquisition failure. As long as the state of charge SOC of the first battery 22 is calculated at a time point close to when an acquisition failure occurred, the state of charge SOC of the first battery 22 will not differ greatly from the most recently calculated state of charge SOC of the first battery 22.

The held state-of-charge KSOC does not have to be calculated when an acquisition failure does not occur.

The characteristic map is not limited to a table or a graph and may be an equation.

The calculation method of the state of charge SOC of the first battery 22 is not limited to the example described in the above embodiment. For example, in a situation in which the absolute value of the charge/discharge current AB of the first battery 22 is small, the state of charge SOC of the first battery 22 may be calculated using the battery output voltage VB detected by the first battery voltage sensor 24. Specifically, when calculating the state of charge SOC of the first battery 22, the state of charge SOC may be calculated by referring to the characteristic map and obtaining a corresponding battery output voltage VB from the characteristic map.

The charge/discharge determination unit 108 does not necessarily have to be used. When the charge/discharge determination unit 108 is omitted, charging and discharging of the first battery 22 will be permitted after an acquisition failure occurs. In this case, as long as the state of charge SOC of the first battery 22 calculated before the occurrence of an acquisition failure is obtained as the held state-of-charge KSOC, the open circuit voltage of the first battery 22 before the occurrence of an acquisition failure can be calculated based on the held state-of-charge KSOC. It is preferred that the target voltage range VZ be calculated based on the open circuit voltage so that the target voltage range VZ is set to an appropriate value.

If the configuration for prohibiting charging and discharging of the first battery when an acquisition failure occurs is omitted like in the above modified example, the state-of-charge calculation process and the pre-charge process can be applied to an electric vehicle that does not include an internal combustion engine.

The vehicle control device 100 may include multiple control devices. Further, functional units such as the state-of-charge calculator 104 and the like may be arranged in separate control devices instead of being arranged in a single control device. In this case, the control devices only need to be configured to transfer information with one another.

When the vehicle control device 100 includes multiple control devices like in the above modified example, a single functional unit may be spread throughout the control devices. For example, in the state-of-charge calculator, a control device that calculates the state of charge SOC of the first battery 22 may be separate from a control device that calculates the held state-of-charge KSOC. In this case, the state-of-charge calculator 104 is configured by the two control devices.

The target calculator may be a functional unit that is separate from the pre-charging unit 106.

The configuration of the power supply circuit 16 is not limited to the example described in the above embodiment.

For example, when determining whether the bidirectional converter 50 has been deactivated to stop increasing the voltage, if the first charging voltage VC1 detected by the first capacitor voltage sensor 43 is used but the converter output voltage VD detected by the converter voltage sensor 52 is not used, the converter voltage sensor 52 may be omitted.

The configuration of the load 18 is not limited to the example described in the above embodiment. For example, the load may include only the motor generator 14 and the inverter 90.

The number of the motor generator 14 included may be changed.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A control device for a power supply circuit, the power supply circuit including a first battery, a voltage sensor configured to detect an output voltage of the first battery, a relay configured to open and close an electric connection from the first battery to a load, a second battery having a lower rated voltage than the first battery, and a converter configured to increase an output voltage of the second battery and output the increased output voltage to a portion between the relay and the load, the control device comprising:
   processing circuitry, wherein
   the processing circuitry is configured to perform a pre-charge process that drives the converter to increase an output voltage of the converter to a value included in a target voltage range, which is set based on the output voltage of the first battery, when the relay opens the electric connection between the first battery and the load,
   the processing circuitry includes a state-of-charge calculator, configured to calculate a state of charge of the first battery, and a target calculator, configured to calculate the target voltage range,
   when the output voltage of the first battery detected by the voltage sensor cannot be acquired and an acquisition failure occurs, after the occurrence of the acquisition failure, the state-of-charge calculator is configured to obtain the state of charge of the first battery, as a held state-of-charge, that was calculated before the occurrence of the acquisition failure, and
   when the pre-charge process is performed in a state in which the acquisition failure is occurring, the target calculator is configured to calculate an estimated output voltage of the first battery from the held state-of-charge and calculate the target voltage range based on the estimated output voltage.

2. The control device according to claim 1, wherein, when the acquisition failure occurs, the state-of-charge calculator is configured to obtain a most recent one of the state of charge of the first battery that was calculated before the occurrence of the acquisition failure as the held state-of-charge.

3. The control device according to claim 1, wherein
   the processing circuitry includes a charge/discharge determination unit that determines whether to charge or discharge the first battery, and
   when the acquisition failure occurs, the charge/discharge determination unit is configured to prohibit charging and discharging of the first battery.

4. A non-transitory computer-readable storage medium that stores a power supply circuit control program, wherein when the power supply circuit control program is executed by processing circuitry of a control device for a power supply circuit, the power supply circuit including a first battery, a voltage sensor configured to detect an output voltage of the first battery, a relay configured to open and close an electric connection from the first battery to a load, a second battery having a lower rated voltage than the first battery, and a converter configured to increase an output voltage of the second battery and output the increased output voltage to a portion between the relay and the load, the power supply circuit control program has the processing circuitry execute:
   a pre-charge process that drives the converter to increase an output voltage of the converter to a value included in a target voltage range, which is set based on the output voltage of the first battery, when the relay opens the electric connection between the first battery and the load;
   a state-of-charge calculation process that calculates a state of charge of the first battery; and
   a target calculation process that calculates the target voltage range, wherein
   when the output voltage detected by the voltage sensor cannot be acquired and an acquisition failure occurs, after the occurrence of the acquisition failure, the state-of-charge calculation process includes a process that obtains the state of charge of the first battery, as a held state-of-charge, that was calculated before the occurrence of the acquisition failure, and
   when the pre-charge process is performed in a state in which the acquisition failure is occurring, the target calculation process includes a process that calculates an estimated output voltage of the first battery from the held state-of-charge and calculates the target voltage range based on the estimated output voltage.

5. A method for controlling a power supply circuit, the power supply circuit including a first battery, a voltage sensor configured to detect an output voltage of the first battery, a relay configured to open and close an electric connection from the first battery to a load, a second battery having a lower rated voltage than the first battery, and a converter configured to increase an output voltage of the second battery and output the increased output voltage to a portion between the relay and the load, the method comprising:
   performing a pre-charge process that drives the converter to increase an output voltage of the converter to a value included in a target voltage range, which is set based on the output voltage of the first battery, when the relay opens the electric connection between the first battery and the load;
   performing a state-of-charge calculation process that calculates a state of charge of the first battery; and
   performing a target calculation process that calculates the target voltage range, wherein when the output voltage detected by the voltage sensor cannot be acquired and an acquisition failure occurs, after the occurrence of the acquisition failure, the state-of-charge calculation process includes a process that obtains the state of charge of the first battery, as a held state-of-charge, that was calculated before the occurrence of the acquisition failure, and when the pre-charge process is performed in a state in which the acquisition failure is occurring, the target calculation process includes a process that calculates an estimated output voltage of the first battery from the held state-of-charge and calculates the target voltage range based on the estimated output voltage.

\* \* \* \* \*